United States Patent [19]

Grabis

[11] Patent Number: 5,445,257
[45] Date of Patent: Aug. 29, 1995

[54] DECLUTCHING DEVICE HAVING A HYDRAULIC ACTUATOR FOR SNAP-FITTING ON-TO A PULL-OFF TYPE CLUTCH

[75] Inventor: Thomas Grabis, Kirchardt, Germany

[73] Assignee: Valeo, Paris, France

[21] Appl. No.: 184,187

[22] Filed: Jan. 21, 1994

[30] Foreign Application Priority Data

Jan. 20, 1993 [FR] France ............... 92 00522

[51] Int. Cl.⁶ ............... F16D 25/08; F16D 23/14
[52] U.S. Cl. ............... 192/85 CA; 192/91 A; 192/98
[58] Field of Search ............... 192/85 CA, 70.13, 98, 192/91 A, 114 R

[56] References Cited

U.S. PATENT DOCUMENTS

| | | | |
|---|---|---|---|
| 4,399,898 | 8/1983 | Olschewski et al. | 192/98 |
| 4,947,975 | 8/1990 | Tojima | 192/98 |
| 4,993,529 | 2/1991 | Leigh-Monstevens et al. | 192/85 CA |
| 5,307,915 | 5/1994 | Grosspietsch et al. | 192/91 A X |

FOREIGN PATENT DOCUMENTS

| | | | |
|---|---|---|---|
| 0200410 | 11/1986 | European Pat. Off. | |
| 220982 | 5/1987 | European Pat. Off. | 192/98 |
| 2304826 | 10/1976 | France | |
| 2651846 | 3/1991 | France | |
| 2653195 | 4/1991 | France | |
| 3113463 | 12/1982 | Germany | 192/98 |
| 3414834 | 10/1985 | Germany | 192/98 |
| 4191068 | 5/1992 | Germany | |

Primary Examiner—Andrea L. Pitts
Attorney, Agent, or Firm—Longacre & White

[57] ABSTRACT

A declutching device comprises an hydraulic actuator, a preloading spring for permanently biassing the movable member of the actuator towards its retracted position with respect to the fixed member of the actuator, and a retaining ball which is adapted to retain the movable member in a withdrawn position with respect to the fixed member during and prior to assembly. A feeler projects outwardly from the hydraulic actuator, so as to be displaced by the clutch while relative axial movement of the clutch and declutching device towards each other is taking place during assembly. The feeler is mounted for movement between a fitting position in which it allows the retaining ball to carry out its above mentioned function, and an operating position in which the retaining ball is no longer effective. The invention is applicable to clutches of the pull-off type, especially for motor vehicles.

9 Claims, 1 Drawing Sheet

DECLUTCHING DEVICE HAVING A HYDRAULIC ACTUATOR FOR SNAP-FITTING ON-TO A PULL-OFF TYPE CLUTCH

FIELD OF THE INVENTION

This invention relates, in general terms, to the assembly of a declutching device to a clutch of the pull-off type, when the declutching device is of the kind that includes a hydraulic actuator, that is to say when it comprises two members, one of which is fixed while the other is movable, and which are arranged in cylinder and piston relationship for relative sliding movement along a cylindrical surface which is defined by the cooperating cylindrical inner and outer surfaces of the members, with these members acting respectively as a cylinder and a piston. The said fixed and movable members define a control chamber between them, and a clutch release bearing is coupled to the movable member of the actuator so as to act in traction on the declutching means of the clutch itself.

More particularly, the invention is directed to the case in which, in the context of a motor vehicle clutch, assembly of the clutch to the declutching device is carried out by snap-fitting these two components together while they are being brought together by relative axial movement. In practice this axial movement is carried out between two units, the first of which comprises the engine of the vehicle together with the clutch, while the other unit comprises the gearbox of the vehicle and the declutching device. To this end, the clutch, or more precisely its declutching means (such as a diaphragm), is provided with a thrust means for engagement with the clutch release bearing of the declutching device through a suitable coupling member.

BACKGROUND OF THE INVENTION

The problem with which the invention is concerned is that, in order that the clutch release bearing can be engaged with the thrust member during fitting, the movable member of the hydraulic actuator which carries it must be in a withdrawn position with respect to the fixed member of the actuator, with which it is associated; in addition, in order that the clutch release bearing shall bear permanently against the thrust means during service through the coupling member, the movable member of the hydraulic actuator is, by contrast, permanently biassed towards its retracted position with respect to the fixed member of the actuator, by suitable preloading means. During the fitting operation it is therefore first necessary to withdraw the movable member of the hydraulic actuator and to hold it in its withdrawn position, and then to release it. In other words, it is necessary to provide retaining means which are adapted to hold the movable member of the actuator in the withdrawn position for so long as the retaining means are effective.

In French patent specification No. FR 2 651 846A, these retaining means comprise a retractable abutment element which can be so controlled as to provide a means for engaging the movable member of the hydraulic actuator, at the rear of the latter. This retractable abutment means calls for an additional specific operation, to remove it so that the movable member of the hydraulic actuator can be released. This adds complication to the fitting operations.

It should be noted that this also increases quite considerably the radial size of the assembly, and that the latter is not only relatively complex and costly to manufacture, but also provides a rigid mechanical abutment surface to the movable member of the hydraulic actuator, so that it is liable to cause damage to one or other of the two members of the hydraulic actuator if the axial thrust which is exerted in order to achieve the required snap-fitting is too great.

DISCUSSION OF THE INVENTION

An object of the invention is to provide a declutching device which does not have the above mentioned drawbacks.

According to the invention, a declutching device for snap-fitting engagement on a clutch of the pull-off type, comprising a hydraulic actuator which itself comprises: two members, of which one is fixed and the other movable, which are arranged in cylinder and piston relationship to each other along a cylindrical surface, and which define a control chamber between them; preloading means permanently biassing said movable member of the hydraulic actuator towards its retracted position with respect to the said fixed member; and retaining means which are adapted to retain the said movable member in its withdrawn position, is characterised in that the declutching device further includes a feeler which is mounted for movement between a fitting position, in which it allows the retaining means to retain said movable member of the hydraulic actuator in its withdrawn position, and an operating postion in which, in order to release said movable member, said feeler neutralizes said retaining means, and in that said feeler projects externally so as to be displaced by the clutch during relative axial movement in which the feeler and clutch are brought together during assembly.

Thus, release of the movable member of the hydraulic actuator during the fitting operation now has the advantage that it takes place in a systematic manner, simply as a function of the relative axial position attained by the declutching device with respect to the clutch during the fitting operation, so that no other specific operation to achieve this is necessary at all.

The various features and advantages of the invention will appear more clearly from a reading of the description of preferred embodiments of the invention, which follows by way of example only and with reference to the accompanying diagrammatic drawings.

DESCRIPTION OF PREFERRED EMBODIMENTS OF THE INVENTION

Figure 1:
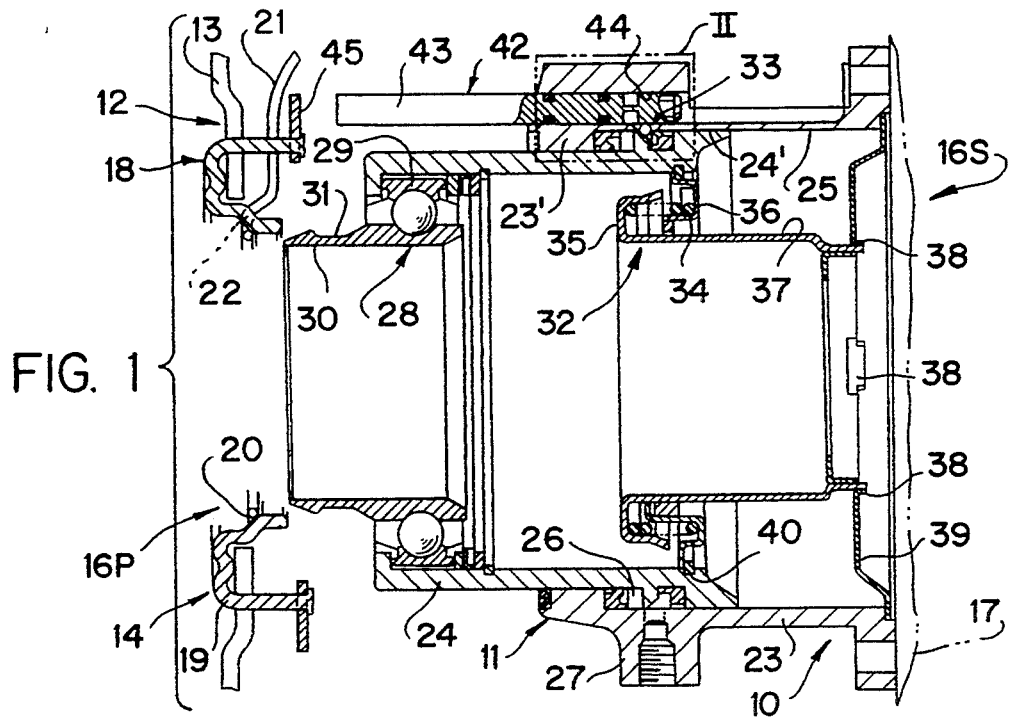
FIG. 1 is a view in axial cross section of a declutching device in accordance with the invention, shown in a position in which the movable member is disconnected from its hydraulic actuator.

Referring first to FIG. 1, it is required to ensure that a declutching device 10, having a hydraulic actuator 11, can be snap-fitted on to a clutch 12 of the pull-off type, the declutching means 13 of which (which in this example is a diaphragm) is equipped for this purpose with thrust means 14.

Where the clutch 12 is a motor vehicle clutch, it, together with the engine, form part of a first unit, or primary unit, 16P, while the declutching device 10, together with the gearbox of the vehicle, are part of a second unit, or secondary unit, 16S. The declutching device 10 is for example secured by means of screws (not shown) on the casing 17 of the gearbox. The snap-fitting referred to above takes place during fitting of the assembly, that is to say while the two units 16P and 16S are being moved towards each other in relative axial motion.

In this example, the thrust means 14 of the clutch 12 is of a known type which comprises a thrust member 18 having a corrugated portion or thrust element 19, which bears on the declutching means 13 on the opposite side of the latter from the declutching device 10. The thrust means 14 also comprises a coupling member 20 by means of which the declutching device 10 is able to exert a tractive force on the thrust member 18. In this example, the coupling member 20 is in the form of a ring, which is formed with a slot so that it is discontinuous, with generally radial arms 21 on either side of the slot. The ring 20 is resiliently deformable radially, and bears on a generally frusto-conical portion 22 of the thrust member 18, on the opposite side of the latter from the declutching device 10. For more detail about such a thrust means 14, reference is invited for example to French patent specification No. 2 653 195 or to corresponding U.S. Pat. No. 5,113,938.

In the present case the hydraulic actuator 11 for the declutching device 10 comprises two members 23 and 24, one of which is fixed while the other is movable; these components are arranged in a piston and cylinder relationship with respect to each other, for relative motion along a cylindrical surface 25 defined by the fixed member 23. Each of the two members 23, 24 has a respective radial flange 23', 24', these flanges being arranged at the respective opposite axial ends of the members 23 and 24. The flanges 23' and 24' define between them a sealed control chamber 26 which is provided with at least one fluid access port 27.

For example, and as shown here, the fixed mebmer 23 of the hydraulic actuator 11 is the outer one of the two members of the latter, i.e. it surrounds the movable member 24. Thus the radial flange 23' of the fixed member 23 is directed towards the axis of the control chamber 26, and it is by means of the fixed member 23 that the hydraulic actuator 11 is secured to the gearbox casing 17. Accordingly, the cylindrical surface 25 which partly delimits the control chamber 26 consists in this case of an internal bore of the fixed member 23.

A clutch release bearing 28 is coupled to the movable member 24 so as to provide the snap-fitting required.

In this example, the clutch release bearing 28 comprises a ball bearing having an outer ring 29 which is located axially on the movable member 24, with automatic centring means having an axial spring as can be seen in FIG. 1. The inner ring of the ball bearing is appropriately extended axially so as to constitute an actuating element 30 which has on its outer periphery an annular groove 31. The actuating element 30 cooperates through one of the flanks of this groove 31 with the coupling member 20 engaging in the groove.

The declutching device 10 also includes: firstly, preloading means 32 which permanently bias the movable member 24 of the hydraulic actuator 11 towards its retracted position with respect to the fixed member 23; and secondly, retaining means 33 which, when in action, are arranged to hold the movable member 24 in the extended or withdrawn position shown in FIG. 1. In the present example, the preloading means 32 are in the form of a spring 34. This spring bears on the base of an annular bell element 35 which is disposed axially on the fixed member 23, and which bears also on the base of a further annular bell element 36 which is located axially on the movable member 24.

In this example, the annular bell element 35 is integral with a cylindrical sleeve 37 which is fastened to a plate element 39 by means of lugs 38. The plate element 39 bears on the rear of the fixed member 23, between the latter and the casing 17 of the gearbox. In conjunction with this, the annular bell element 36 bears on a resilient split ring 40 which is fitted into a groove of the movable member 24.

Figure 2:
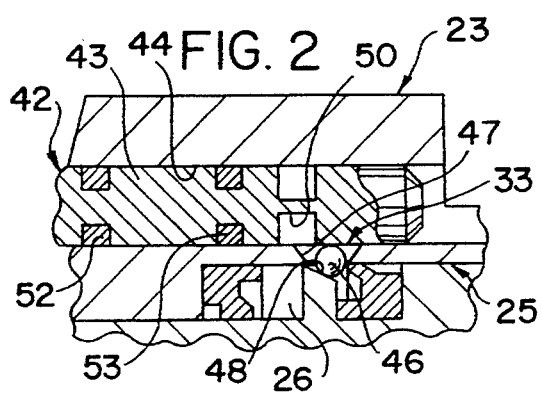
FIG. 2 is a partial view in axial cross section, repeating on a larger scale the detail of FIG. 1 which is enclosed within a box II in phantom lines in FIG. 1.

The declutching device 10 also includes a feeler 42. This feeler is mounted for movement between a fitting position and an operating position. In the fitting position, which is shown in FIGS. 1 and 2 and which will be described in greater detail below, the feeler allows the retaining means 33 to act in their retaining capacity, so as to retain the movable member 24 of the hydraulic actuator 11 in its withdrawn or extended position.

Figure 3A:
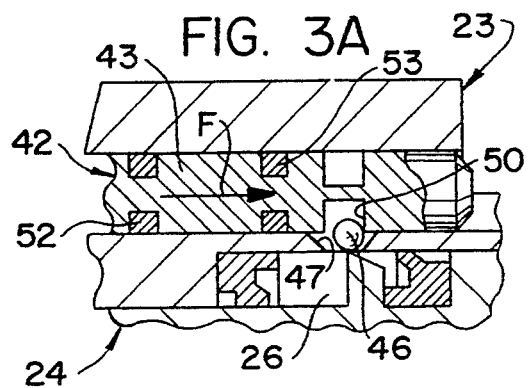
FIGS. 3A and 3B are further partial views in axial cross section similar to FIG. 2, but illustrating the release of the movable member from the hydraulic actuator.
Figure 3B:
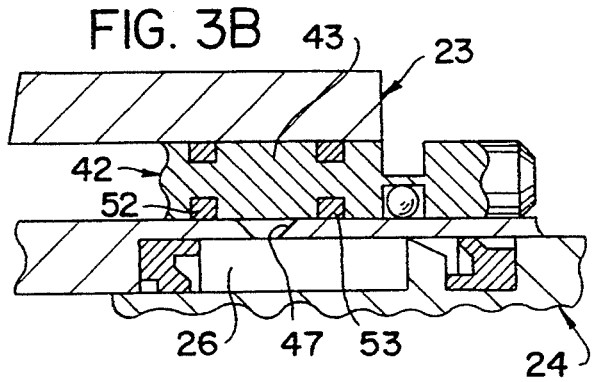

In its operating position, which is shown in FIGS. 3A and 3B, the feeler 42 neutralizes the action of the retaining means 33 so as to release the movable member 24. The feeler 24 projects out of the actuator as shown in FIG. 1, so as to be actuated by the clutch 12 during the relative axial movement whereby the clutch and actuator are brought together during assembly.

In this example, the feeler 42 is in the form of a bar 43, which is mounted for sliding movement in a bore 44 formed in the fixed member 23 of the hydraulic actuator 11. The bore 44 is parallel to the axis of the cylindrical surface 25, and therefore also parallel to the axis of the control chamber 26. The thrust member 18 of the clutch 12 carries an annular plate element 45 for axial engagement with the bar 43. For example, and as shown in the drawings, the annular plate element 45 may be fastened, by crimping, on to lugs formed as axial extensions of the radially outermost part of the thrust member 18, with these fingers passing between the fingers of the diaphragm 13. Also, in the present example the bar 43 is mounted for free sliding movement in the bore 44 with very little friction.

In FIGS. 1, 2, 3A and 3B, the retaining means 33 comprise at least one ball 46, and the latter is arranged in a hole 47 formed in the fixed member 23 of the hydraulic actuator 11. This hole 47 is formed generally transversely in the fixed member 23, and is generally frusto-conical in shape. It is open radially on a first side through the cylindrical surface 25 of the actuator, in the path of a shoulder 48 by means of which the movable member 24 of the actuator is able to cooperate in abutting relationship with the ball 46. On the opposite side, within the bore 44, the hole 47 is open in the path of the bar 43 of the feeler 42, being flared outwardly towards the bore 44. The bar 43 is formed with a transverse recess 50 in which the ball 46 can be accommodated, as seen in FIGS. 3A and 3B. This recess 50 preferably contains silicone grease for retaining the ball 46 when it is engaged in the recess.

In the present example, the hole 47 formed in the fixed member 23 of the hydraulic actuator 11 is open in a portion of the cylindrical surface 25 which is part of the control chamber 26. The shoulder 48 of the fixed member 23 is generally oblique with respect to the axis of the cylindrical surface 25 (and therefore with respect to the axis of the control chamber 26), the shoulder 48 being inclined away from the bore 44, considered in the axial direction going towards that end of the movable member 24 that lies within the fixed member 23. The recess 50 formed in the bar 43 of the feeler 42 is in the form of an annular groove.

Again in this example, the bar 43 of the feeler 42 carries two sealing rings 52 and 53 arranged transversely and spaced axially away from the groove 50. The sealing rings 52 and 53 are spaced apart in such a way that the hole 47 in the fixed member 23 of the hydraulic actuator 11 can lie between them as shown in FIG. 3B. The number of balls 46 may for example be one as shown.

Assembly in order to achieve the required snap-fitting effect may for example be as follows. The first step can be carried out in the factory of the manufacturer of the declutching device 10. On the other hand it may be carried out by the motor vehicle manufacturer itself. In this first step, the movable member 24 of the hydraulic actuator 11 of the declutching device 10 is put into its extended position (FIG. 1) against the action of the spring 34 of the preloading means 32. The control chamber 26 is depressurised, and the bar 43 of the feeler 42 is arranged to be in such a position that (as shown in FIGS. 1 and 2) that portion of the bar 43 which lies on the other side of its recess 50 from the sealing rings 52 and 53 at least partly covers the hole 47 in the fixed member 23 of the hydraulic actuator 11.

The movable member 24 is then displaced so that it comes into abutment, through its shoulder 48, against the ball 46 of the retaining means 33, the latter being itself also in engagement against the wall of the hole 47 in the fixed member 23 as shown in FIG. 2. In this way, the movable member 24 is now retained in its withdrawn position by the retaining means 33.

In a second step in the assembly process, and with the movable member 24 of the hydraulic actuator 11 being thus in its withdrawn position, the two units 16P and 16S are brought axially towards each other, so as to bring the declutching device 10 and the clutch 12 towards each other. This causes the thrust member 30 of the clutch release member 28 to be engaged in the coupling member 20 of the clutch 12, by virtue of a temporary elastic deformation of the coupling member 20. During this relative axial movement, the bar 43 of the feeler 42 comes into engagement on the annular plate member 45 of the thrust member 18 of the clutch 12.

Once this has taken place, and if the relative axial movement of the units 16P and 16S is continued, the bar 43 of the feeler 42 becomes in due course axially engaged in the bore 44 of the fixed member 23 of the hydraulic actuator 11, as indicated by the arrow F in FIG. 3A. When, as seen in FIG. 3A, the recess 50 in the bar 43 comes into line with the hole 47 in the fixed member 23 of the hydraulic actuator 11, the ball 46 of the retaining means 33, urged radially by the shoulder 48 of the movable member 24 under the biassing action of the preloading means 32 to which the movable member 24 is subjected, becomes engaged in the recess 50. The bar 43 then pushes on the ball 46 so that the latter is removed completely from the hole 47. In this way, the retaining means 33 are neutralized.

The procedure described above only progresses with relative axial movement of the units 16P and 16S towards each other which is sufficiently great for the coupling member 20 to be in line with the groove 31 in the actuating element 30 of the clutch release bearing 28 after its engagement by resilient deformation on the actuating element 30.

Once released by the ball 46 of the retaining means 33, the movable member 24 of the hydraulic actuator 11 then comes into hooked engagement in the groove 31 of the coupling member 20, under the biassing force exerted on it by the preloading means 32. The relative axial movement of the units 16P and 16S is then continued still further, so that the bar 43 of the feeler 42 then covers the hole 47 in the fixed member 23 of the hydraulic actuator 11, by means of its solid portion lying between the two sealing rings 52 and 53 (see FIG. 3b). It is then itself retained by friction in the position thus reached.

It will be appreciated that the snap-fitting action achieved in this way does not involve any need to exert any other axial force than that necessary for engagement of the coupling member 20 on the actuating element 30 of the clutch release bearing 28. It will also be appreciated that this snap-fitting takes place by itself and systematically, in response to the simple information given by the feeler 42 as to the relative axial position of the units 16P and 16S while they are being brought together.

Figure 4:
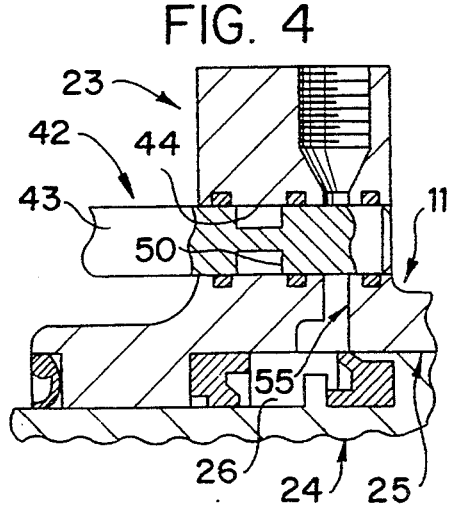
FIG. 4 is a partial view in axial cross section, again similar to FIG. 2 but showing a modification.

Reference is now made to FIG. 4, in which the retaining means 33 are constituted as a result of at least partial evacuation of the control chamber 26, while the bore 44 in the fixed member 23 of the hydraulic actuator 11, in which the bar 43 of the feeler 42 is mounted for sliding movement, intersects a passage 55 which extends transversely between the control chamber 26 and the outside. The transverse recess 50 of the bar 43 of the feeler 42 is arranged to provide, by itself, a flow path between the two portions of this passage 55, which portions extend on either side, respectively, of the bore 44.

Thus, when the bar 43 of the feeler 42 is forced in, the vacuum in the control chamber 26 is broken by the recess 50, which, as described above, releases the movable member 24 from the hydraulic actuator 11, so that fluid (which may be any known suitable fluid) can penetrate into the control chamber 26.

The present invention is of course not limited to the embodiments described above and shown in the drawings, but embraces any other variant, especially in regard to the coupling member. The latter, as described in French patent specification FR 2 304 826 (which describes various embodiments, all of which may be used here), may be carried by the actuating element of the clutch release bearing instead of being part of the thrust means of the clutch.

The annular plate element on which the bar of the feeler engages during assembly may also be made integral with the thrust member of the thrust means of the clutch; alternatively it may be in the form of axial projections arranged in spaced apart relationship on the fingers of the clutch diaphragm.

What is claimed is:

1. A declutching device for a pull-off type clutch, for snap-fitting engagement with the latter, said declutching device comprising: a hydraulic actuator having a fixed member and a movable member which together define a cylindrical interface surface having an axis, one of said fixed and movable members being mounted within the other for sliding movement of the movable member with respect to the fixed member along said interface surface said fixed and movable members further defining a control chamber between them; and preloading means engaged with said movable member for biassing the latter permanently towards a retracted position in which the movable member is retracted into the fixed member, with one of said fixed and movable members defining retaining means for retaining the movable member in a withdrawn position with respect to the fixed member, wherein the declutching device further includes a feeler, and means in one of said fixed and movable members mounting said feeler therein so that the feeler projects outwardly therefrom for engagement with an associated said clutch when relative axial movement brings the clutch and the actuator together during assembly, and for movement of said feeler in said mounting means between a fitting position and an operating position, the feeler and retaining means being so arranged that in said fitting position the feeler allows the retaining means to retain the movable member in its said withdrawn position, and so that in said operating position the feeler neutralizes the retaining means whereby to release the movable member for movement with respect to the fixed member.

2. A declutching device according to claim 1, wherein said feeler comprises a bar, said fixed member having a bore parallel to axis of the said cylindrical interface surface, said bar being mounted for sliding movement in said bore.

3. A declutching device according to claim 2, wherein said bar is mounted for free sliding movement in said bore.

4. A declutching device according to claim 2, wherein said retaining means comprise at least one ball, said fixed member having a transverse hole mounting said ball, said fixed member defining a shoulder for engagement with the ball, said hole being open radially at a first side in said cylindrical interface surface, and at its second side into said bore, the feeler having a transverse recess whereby it is adapted to pick up said ball.

5. A declutching device according to claim 4, wherein said shoulder is generally oblique with respect to the axis of said cylindrical interface surface, said movable member having an end portion engaged with the fixed member on said interface surface, said shoulder being inclined away from said ball in the fixed member in the direction of said end portion of the movable member.

6. A declutching device according to claim 4, wherein said hole is open in a portion of said interface surface which is part of the control chamber.

7. A declutching device according to claim 4, wherein the feeler further comprises two transverse sealing rings spaced apart from each other and spaced away from said recess, whereby to be able to lie on either side of said hole in the fixed member.

8. A declutching device according to claim 2, wherein the control chamber is adapted to be at least partially evacuated whereby to define said retaining means, with said fixed member of the hydraulic actuator further defining a transverse passage extending between said control chamber and the outside and being interrupted by said bore whereby to define two portions of said transverse passage lying respectively on either side of said bore, the bar of said feeler further having a transverse recess for bringing the two said portions of the transverse passage into communication with each other.

9. A declutching device according to claim 4, wherein said recess in the bar of the feeler is an annular groove.

* * * * *